Patented July 20, 1948

UNITED STATES PATENT OFFICE 2,445,724

VULCANIZATION ACCELERATOR

George E. P. Smith, Jr., Akron, Ohio, assignor to The Firestone Tire & Rubber Company, Akron, Ohio, a corporation of Ohio No Drawing. Application April 10, 1944, Serial No. 530,392

6 Claims. (Cl. 260—785)

This invention relates to the vulcanization of a rubber, and relates especially to a new class of rubber vulcanization accelerators.

The objects of the invention include providing a new class of rubber vulcanization accelerators having delayed action, providing a new class of vulcanizable rubber compositions and improved vulcanized rubber products. Other objects will be manifest in the description of the invention which follows:

The accelerators of the present invention are disulfides of the following general formula:

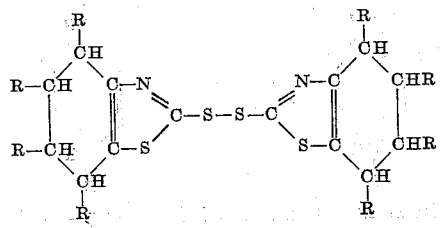

wherein R is hydrogen, an alkyl radical or an alkoxy radical. Examples of disulfides included in the invention are di-tetrahydrobenzothiazyl-disulfide, di(5-methyl-tetrahydro-benzothiazyl) disulfide, di(5-ethyl-tetrahydrobenzothiazyl) disulfide, di(5,6-dimethyl-tetrahydrobenzothiazyl) disulfide, di(4-methyl-tetrahydrobenzothiazyl) disulfide, di(5,6-diethyl-tetrahydrobenzothiazyl) disulfide, di(4,5-diethyl-tetrahydrobenzothiazyl) disulfide, di(5-methyl-6-methoxy-tetrahydrobenzothiazyl) disulfide, di(7-ethyl-tetra-hydrobenzothiazyl) disulfide, and di(5-methoxy-tetrahydrobenzothiazyl) disulfide.

The disulfides of the invention may be readily prepared by the oxidation of a suitable 2-mercapto-tetrahydrobenzothiazole. For example, an aqueous solution of the sodium salt of the mercaptan may be treated with iodine to cause the precipitation of the disulfide. The reaction may be represented as follows:

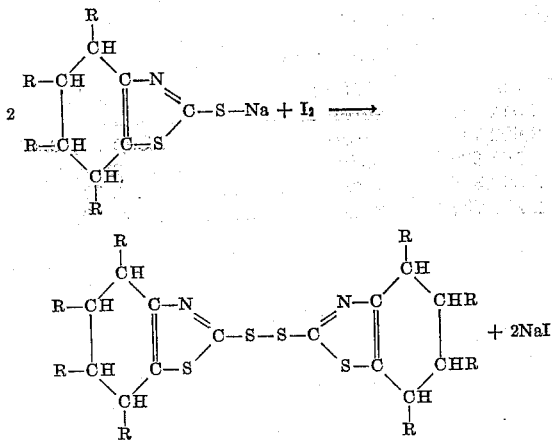

The mercaptans may be prepared by the reaction of ammonium dithiocarbamate with an alpha chlorocyclohexanone.

As a specific example, 14.4 grams of 2-chlorocyclohexanone were added to 12.0 grams of freshly prepared ammonium dithiocarbamate, together with a little ether. The reaction was not violent, and the mixture was allowed to stand 15 hours at room temperature. The ether was removed by evaporation, leaving a brown solid. On extracting this solid with benzene there were obtained 6.8 grams of 2-mercapto-tetrahydrobenzothiazole. On recrystallizing this mercaptan from benzene a white solid was obtained melting at 174–176° C. A portion of the mercaptan was dissolved in an aqueous solution of sodium hydroxide to form a solution of the sodium salt. This solution was stirred and a solution of iodine in aqueous potassium iodide solution was added dropwise. The disulfide precipitated immediately. When no further precipitate formed, the precipitate was separated from the solution, dried and recrystallized from benzene. The pure di-tetrahydrobenzothiazyl-disulfide is a white solid melting at 98–100° C.

The disulfide, so prepared, was tested as a rubber vulcanization accelerator by comparing it with the standard accelerator, mercaptobenzothiazole, in the following rubber formula:

| Ingredients: | Parts by weight |
|---|---|
| Rubber (smoked sheets) | 100.00 |
| Sulfur | 3.00 |
| Zinc oxide | 5.00 |
| Stearic acid | 1.10 |
| Accelerator | 0.75 |

Samples of the two rubber compositions, so formulated, were heated for 30 minutes at 240° F. to determine whether or not they possessed any tendency to pre-vulcanize or set-up during processing operations prior to the usual vulcanizing step, and the following physical testing data were obtained:

| Accelerator | Modulus of Elasticity in lbs./in.² at elongation of 600% | Tensile Strength in lbs./in.² at break |
|---|---|---|
| Mercaptobenzothiazole | 400 | 2250. |
| Di-tetrahydrobenzothiazyl-disulfide | No cure | No cure. |

Other samples of the same rubber compositions were heated for 40, 60 and 100 minutes at 280° F. to test the accelerating ability of the disulfide at a conventional vulcanizing temperature, and the following data resulted:

| Accelerator | Modulus of Elasticity in lbs./in.² at elongation of 600% | | | Tensile Strength in lbs./in.² at break | | |
| --- | --- | --- | --- | --- | --- | --- |
| Minutes | 40 | 60 | 100 | 40 | 60 | 100 |
| Mercaptobenzothiazole | 650 | 600 | 575 | 2,700 | 2,750 | 2,625 |
| Di-tetrahydrobenzo-thiazyl-disulfide | 650 | 800 | 825 | 2,550 | 2,900 | 3,250 |

The two sets of testing data given above show that the disulfide is an excellent delayed-action accelerator of the vulcanization of rubber, since the rubber composition including it did not vulcanize at the relatively low vulcanizing temperature of 240° F. (which is often reached during factory processing of a rubber composition), in contrast with the composition including the standard accelerator, mercaptobenzothiazole. Furthermore, the new accelerator imparted a good cure to the rubber at the conventional vulcanizing temperature of 280° F. It may be noted that the new accelerator produced higher tensile strengths in the rubber at the higher cures.

Other members of the preferred class of accelerators, such as those enumerated above, are likewise efficient accelerators of the safe, delayed-action type. The uncured rubber compositions are extremely easy to handle in the factory, as they do not tend to set-up prematurely, although they readily change into vulcanizates having high physical properties at conventional vulcanizing temperatures.

The new class of accelerators is equally effective in rubber tread compounds, latex compounds or other conventional types of vulcanizable compounds of rubber, reclaimed rubber or synthetic rubber. The various synthetic rubbers vulcanizable by heating with sulfur are herein considered equivalent to natural rubber, examples being butadiene polymers, isoprene polymers and various interpolymers of conjugated diolefins and vinyl compounds, such as Buna S (copolymer of butadiene and styrene) and Buna N (copolymer of butadiene and acrylonitrile). Although sulfur has hereinabove been mentioned as the preferrd vulcanizing agent, other known vulcanizing agents susceptible to acceleration are contemplated.

Accelerator activators, especially of the basic type, may be employed with the new class of accelerators when extremely rapid vulcanization is desired, especially at low temperatures. The new accelerators may be employed in other proportions than the proportion shown in the above example, but will normally be utilized in the range of 0.1 to 10 parts per 100 parts of rubber.

Modification may be resorted to and obvious chemical equivalents substituted in the specific examples of the invention without departing from the spirit or the scope of the invention as defined in the appended claims.

What is claimed is:
1. The method of vulcanizing rubber which includes heating a rubber and sulfur in the presence of di-tetrahydrobenzothiazyl-disulfide.

2. A vulcanizable rubber composition including sulfur and di-tetrahydrobenzothiazyl-disulfide.

3. A vulcanized rubber product prepared by heating a rubber and sulfur in the presence of di-tetrahydrobenzothiazyl-disulfide.

4. The method of vulcanizing a rubber which includes heating a rubber and sulfur in the presence of di-tetrahydrobenzothiazyl-disulfide of the formula

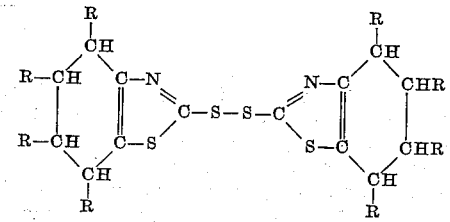

wherein R is a member of the group consisting of hydrogen, alkyl radicals and alkoxy radicals.

5. A vulcanizable rubber composition including sulfur and a di-tetrahydrobenzothiazyl-disulfide of the formula

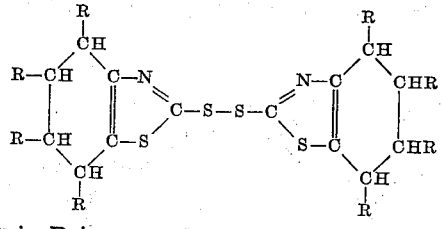

wherein R is a member of the group consisting of hydrogen, alkyl radicals and alkoxy radicals.

6. A vulcanized rubber product prepared by heating a rubber and sulfur in the presence of a di-tetrahydrobenzothiazyl-disulfide of the formula

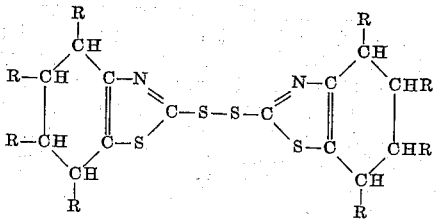

wherein R is a member of the group consisting of hydrogen, alkyl radicals and alkoxy radicals.

GEORGE E. P. SMITH, Jr.

REFERENCES CITED

The following references are of record in the file of this patent:

UNITED STATES PATENTS

| Number | Name | Date |
| --- | --- | --- |
| 1,544,688 | Sebrell | July 7, 1925 |
| 2,092,712 | Clifford | Sept. 7, 1937 |
| 2,196,607 | Mathes | Apr. 9, 1940 |
| 2,262,398 | Jones | Nov. 11, 1941 |
| 2,264,757 | Jones | Dec. 2, 1941 |